(12) United States Patent
Brosowsky et al.

(10) Patent No.: US 11,445,354 B1
(45) Date of Patent: Sep. 13, 2022

(54) SYSTEM AND METHOD FOR TRANSLATING GEODETIC POSITION MEASUREMENTS OF EMERGENCY CALLER LOCATIONS INTO DISPATCHABLE ADDRESS LOCATIONS

(71) Applicant: Geo-Comm, Inc., St. Cloud, MN (US)

(72) Inventors: John Brosowsky, St. Cloud, MN (US); Karl Larsen, St. Cloud, MN (US); Steven Henningsgard, St. Cloud, MN (US); Darell Stoick, St. Cloud, MN (US); Jacqueline Vaquerano, St. Cloud, MN (US); Chris Nelson, St. Cloud, MN (US)

(73) Assignee: Geo-Comm, Inc., St. Cloud, MN (US)

( * ) Notice: Subject to any disclaimer, the term of this patent is extended or adjusted under 35 U.S.C. 154(b) by 0 days.

(21) Appl. No.: 17/349,993

(22) Filed: Jun. 17, 2021

Related U.S. Application Data

(60) Provisional application No. 63/040,165, filed on Jun. 17, 2020.

(51) Int. Cl.
| | |
|---|---|
| *H04W 4/33* | (2018.01) |
| *H04W 4/029* | (2018.01) |
| *H04W 4/90* | (2018.01) |
| *H04W 4/80* | (2018.01) |

(52) U.S. Cl.
CPC .......... *H04W 4/90* (2018.02); *H04W 4/029* (2018.02); *H04W 4/33* (2018.02); *H04W 4/80* (2018.02)

(58) Field of Classification Search
CPC ......... H04W 4/90; H04W 4/33; H04W 4/029; H04W 4/80
See application file for complete search history.

(56) References Cited

U.S. PATENT DOCUMENTS

| | | | | |
|---|---|---|---|---|
| 7,826,598 | B1* | 11/2010 | Prozeniuk | H04M 3/42314 455/556.1 |
| 10,425,800 | B1* | 9/2019 | Panchal | H04W 4/025 |
| 2014/0324381 | A1* | 10/2014 | Venkatraman | G01C 21/206 702/138 |
| 2015/0347455 | A1* | 12/2015 | Stanger | G06Q 90/20 707/829 |
| 2016/0029224 | A1* | 1/2016 | Edge | H04W 16/18 455/456.1 |
| 2016/0337828 | A1* | 11/2016 | Michaelis | H04W 12/06 |
| 2017/0041963 | A1* | 2/2017 | Edge | H04W 4/90 |
| 2017/0188327 | A1* | 6/2017 | Shvodian | H04W 64/00 |
| 2018/0091939 | A1* | 3/2018 | Venkatraman | H04W 4/021 |
| 2018/0188035 | A1* | 7/2018 | Brosowsky | H04W 4/023 |

(Continued)

*Primary Examiner* — Steven S Kelley
(74) *Attorney, Agent, or Firm* — Michael A. Bondi; Moss & Barnett

(57) ABSTRACT

A method for translating geodetic position measurements of emergency caller locations into dispatchable address locations that includes transmitting a geodetic location of a mobile communication device that is being used by a caller in a building to a public safety answering point, providing a building data store that includes a civic address for the building, latitude and longitude coordinates defining a 2-dimensional footprint of the building and vertical information about the building, using the building data store to convert the geodetic location to the civic address and transmitting the civic address of the mobile communication device to the public safety answering point.

13 Claims, 10 Drawing Sheets

(56) References Cited

U.S. PATENT DOCUMENTS

| | | | | |
|---|---|---|---|---|
| 2018/0255431 A1* | 9/2018 | Robertson | .............. | H04W 4/023 |
| 2019/0045323 A1* | 2/2019 | Roissard | ................. | G06T 3/005 |
| 2019/0371054 A1* | 12/2019 | Young | ................... | H04W 4/029 |
| 2020/0049501 A1* | 2/2020 | Han | ......................... | G01C 5/06 |
| 2020/0112831 A1* | 4/2020 | Blaha, Jr. | .............. | H04W 4/025 |
| 2021/0219123 A1* | 7/2021 | Kelly | ..................... | H04W 4/33 |

* cited by examiner

```
pragma solidity ^0.4.21;

/**
    HRC20Token Standard Token implementation
*/
contract HRC20 { string public name = 'GIS Token'; // New Geographic Information Systems Token
    string public symbol = 'GIS'; // Token Symbol GIS string public standard = 'Token 0.1'; // Do not change this one.

uint8 public decimals = 8; // It's recommended to set decimals to 8.

uint256 public totalSupply = 100000000000; // Total supply of GIS tokens
            is 100 billion mapping (address => uint256) public balanceOf;
    mapping (address => mapping (address => uint256)) public allowance;

// This generates a public event on the blockchain that will notify clients
    event Transfer(address indexed _from, address indexed _to, uint256 _value);

/**
     * Constructor function
     *
     * Initializes contract with initial supply tokens to creator of contract
     */
    function HRC20() public {
        totalSupply =  totalSupply * 10 ** uint256(decimals);
        balanceOf[msg.sender] = totalSupply; // Give creator all initial tokens
    }
```

Fig. 5

SYSTEM AND METHOD FOR TRANSLATING GEODETIC POSITION MEASUREMENTS OF EMERGENCY CALLER LOCATIONS INTO DISPATCHABLE ADDRESS LOCATIONS

REFERENCE TO RELATED APPLICATION

This application claims priority to Provisional Applic. No. 63/040,165, filed on Jun. 17, 2020, the contents of which are incorporated herein by reference.

FIELD OF THE INVENTION

The invention relates generally to systems and methods for handling of emergency calls. More particularly, the invention relates to system and method for translating geodetic position measurements of emergency caller locations into dispatchable address locations.

BACKGROUND OF THE INVENTION

In 2015 and 2019 the FCC imposed new rules on the nation's wireless carriers that require calculation of geodetic locations, including z-axis (vertical) positions in the raw position measurement of Height Above Ellipsoid ("HAE"). Leading up to the FCC vote on the rules, dissenting FCC commissioner views, some industry associations, and 9-1-1 Public Safety Answering Point ("PSAP") representatives expressed that raw position measurements including HAE are not actionable for emergency response unless first converted into dispatchable address locations such as a street address with sub address information such as floor number.

Some noted that in worst case scenarios, receiving raw geodetic 9-1-1 caller positions at a 9-1-1 PSAP could result in emergency response delays if 9-1-1 PSAP users need to perform additional work and research to determine, synthesize and communicate a caller location to which help could be dispatched.

Conversions of raw geodetic measurements into civic addresses with sub-address elements could be calculated if certain detailed building information were known ahead of time, but currently there is no data source containing necessary information for each of more than 125 million buildings in the United States and current methods for collecting building information are not technically or economically feasible for millions of buildings.

Accordingly, 911 call takers, dispatchers and emergency responders need a system and method for converting raw geodetic position measurements of emergency caller locations into dispatchable locations that are actionable for reducing emergency response times.

A technically efficient means for gathering and curating building metadata for millions of buildings must be coupled with the geodetic position translation system and methods.

SUMMARY OF THE INVENTION

An embodiment of the invention is directed to creating a building footprint database by extracting geo-referenced polygon geometries from aerial, satellite, and/or LIDAR data using machine learning, computer vision and feature extraction automation methods.

The footprint records are attributed with NG9-1-1 format civic address locations. The footprint records are further attributed with vertical height metadata. The resulting database is exposed via secure web services, web map feature service hosting and database distribution technologies.

The system may be used to convert raw position measurements such as latitude, longitude and height above ellipsoid into a dispatchable street addresses such as "1234 Lincoln Ave, Floors 15-18". A blockchain-based crowdsourcing mechanism is coupled with the translation system for gathering and curating specific building metadata required for performing the necessary geodetic location to civic address translations.

Another embodiment of the invention is directed to a method for translating geodetic position measurements of emergency caller locations into dispatchable address locations. A geodetic location of a mobile communication device that is being used by a caller in a building is transmitted to a public safety answering point. A building data store is provided that includes a civic address for the building, latitude and longitude coordinates defining a 2-dimensional footprint of the building and vertical information about the building. The building data store is used to convert the geodetic location to the civic address. The civic address of the mobile communication device is transmitted to the public safety answering point.

Another embodiment of the invention is directed to a method for translating geodetic position measurements of emergency caller locations into dispatchable address locations. A geodetic location of a mobile communication device that is being used by a caller in a building is transmitted to a public safety answering point. The building has a plurality of floors. A building data store is provided that includes a civic address for the building, latitude and longitude coordinates defining a 2-dimensional footprint of the building and vertical information about the building. The building data store is populated utilizing crowdsourced input from a person and wherein the crowdsourced input relates to at least one of a number of floors in the building and a height of the floors in the building. The person is compensated for providing the crowdsourced input to incentivize the person to provide the crowdsourced input. The building data store is used to convert the geodetic location to the civic address. The civic address of the mobile communication device is transmitted to the public safety answering point.

Another embodiment of the invention is directed to a system for translating geodetic position measurements of emergency caller locations into dispatchable address locations that includes a public safety answering point, a building data store, crowdsourced input and compensation. The public safety answering point is capable of receiving a geodetic location of a mobile communication device that is being used by a caller in a building. The building has a plurality of floors. The building data store includes a civic address for the building, latitude and longitude coordinates defining a 2-dimensional footprint of the building and vertical information about the building. The crowdsourced input from a person is used to populate the building data store. The crowdsourced input relates to at least one of a number of floors in the building and a height of the floors in the building. The compensation is provided to the person for providing the crowdsourced input to incentivize the person to provide the crowdsourced input. The building data store converts the geodetic location to the civic address that is transmitted to the public safety answering point.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 5 depicts a smart contract in solidity code used to create 100 billion HRC-20 "GIS" tokens on the Althash blockchain that then are proportionally transferred to app users based on an amount of in-app reward points earned.

DETAILED DESCRIPTION OF THE INVENTION

A building footprint database is created by extracting geo-referenced polygon geometries from aerial, satellite, and/or LIDAR data using machine learning, computer vision, and feature extraction automation methods.

The footprint records are attributed with NG9-1-1 Presence Information-Location Object ("PIDF-LO") format civic address locations. Civic addresses may be obtained from 9-1-1 addressing authorities, the National Address Database ("NAD"), locally authoritative sources or the blockchain based crowdsourcing mechanism.

The footprint records are additionally attributed with vertical location metadata including number of floors, height per floor, spacing between floors, building height, and height above ellipsoid at ground level and at each additional floor level. Height between floors may be represented as a comma separated string of values in the format (floor#, floor height, space above) for example "(1,12,3),(2,14,3),(3,12,5)" depicts that floor 1 is 12 feet tall with 3 foot space above before floor 2 starts, floor 2 is 14 feet tall with a 3 foot space above, and floor 3 is 12 feet tall with 5 foot space above).

Height above ellipsoid ("HAE") at floor levels may be expressed as comma separated strings values in the format (floor#, HAE) for example "(1,-50), (2,-40), (3,-30). The vertical location data may also include heights expressed in height above mean sea level ("MSL") and/or height above terrain ("HAT"). It is anticipated that some building footprint records will have all vertical location metadata attributes populated, and that other building footprint records will have only a subset of vertical location metadata attributes populated.

A Building Floor Location API may be implemented as a restful Web API built on .NET core 2.1 and C#. It should be obvious to those skilled in art that the API may alternatively be constructed using other programming languages and computing platforms.

An HTTP POST resource that accepts a JavaScript Object Notation ("JSON") body comprising X (latitude), Y (longitude) and Z (caller elevation). Thus, an exemplary request URL may have the structure http://localhost:5232/api/values and an exemplary JSON request body may have the structure {"x":−94.160737,"y":45.561018,"z":1040}.

Figure 1:
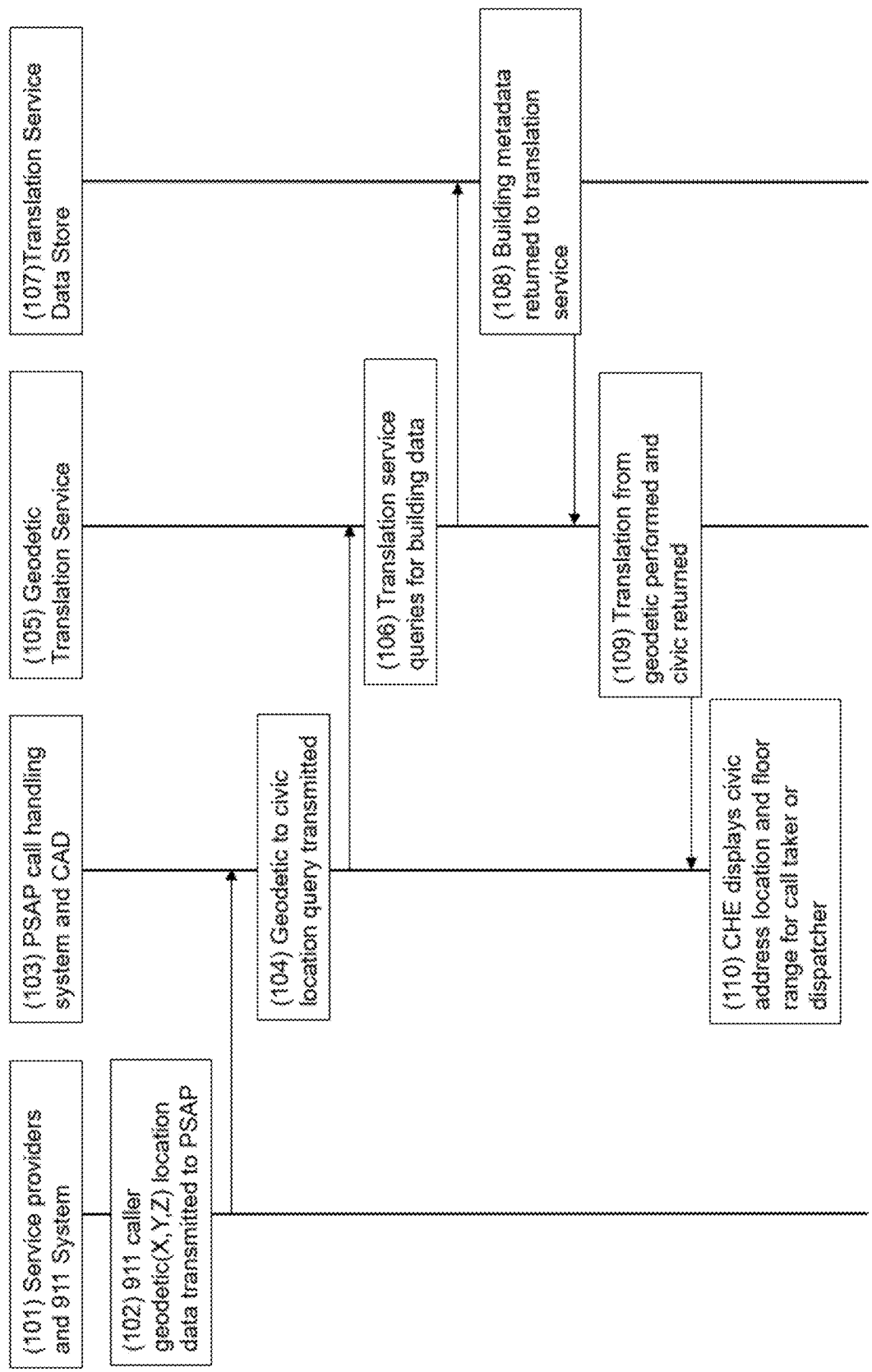
FIG. 1 depicts utilization of the invention by a PSAP call handling system and computer-aided dispatch ("CAD") (103). The 911 system (101) transmits geodetic caller location to the PSAP using currently available common interfaces (102). The PSAP call handling system (104) then utilizes the inventive geodetic translation service (105) to convert the geodetic location into a civic address with floor range. The geodetic translation service (105) in turn queries the translation service's building data store (107) and the data store (107) returns building metadata (108) necessary to convert the proffered geodetic location into a civic address with floor ranges. The geodetic translation service then transmits the computed civic location back to the 911 call handling system (109) for display using call-handling equipment ("CHE") to 911 call takers and dispatchers (110).

In an exemplary implementation, there may be a calling application such as a 9-1-1 call taker, dispatcher, or responder application, the building location API web service, and a cloud hosted or native geographic information systems data store, as shown in FIG. 1.

In this case 9-1-1 caller location data provided to the call answering system includes latitude, longitude, and height above ellipsoid. The 9-1-1 call answer system then programmatically performs a query to the inventive geodetic translation service wherein the query parameters include latitude, longitude and height above ellipsoid.

The inventive geodetic translation service then calculates a civic address location with sub-address element floor range and returns this information to the querying 9-1-1 call answering system. The 9-1-1 call answering system then displays the civic address location with sub-address element floor range to the 9-1-1 call taker or dispatcher.

Figure 2:
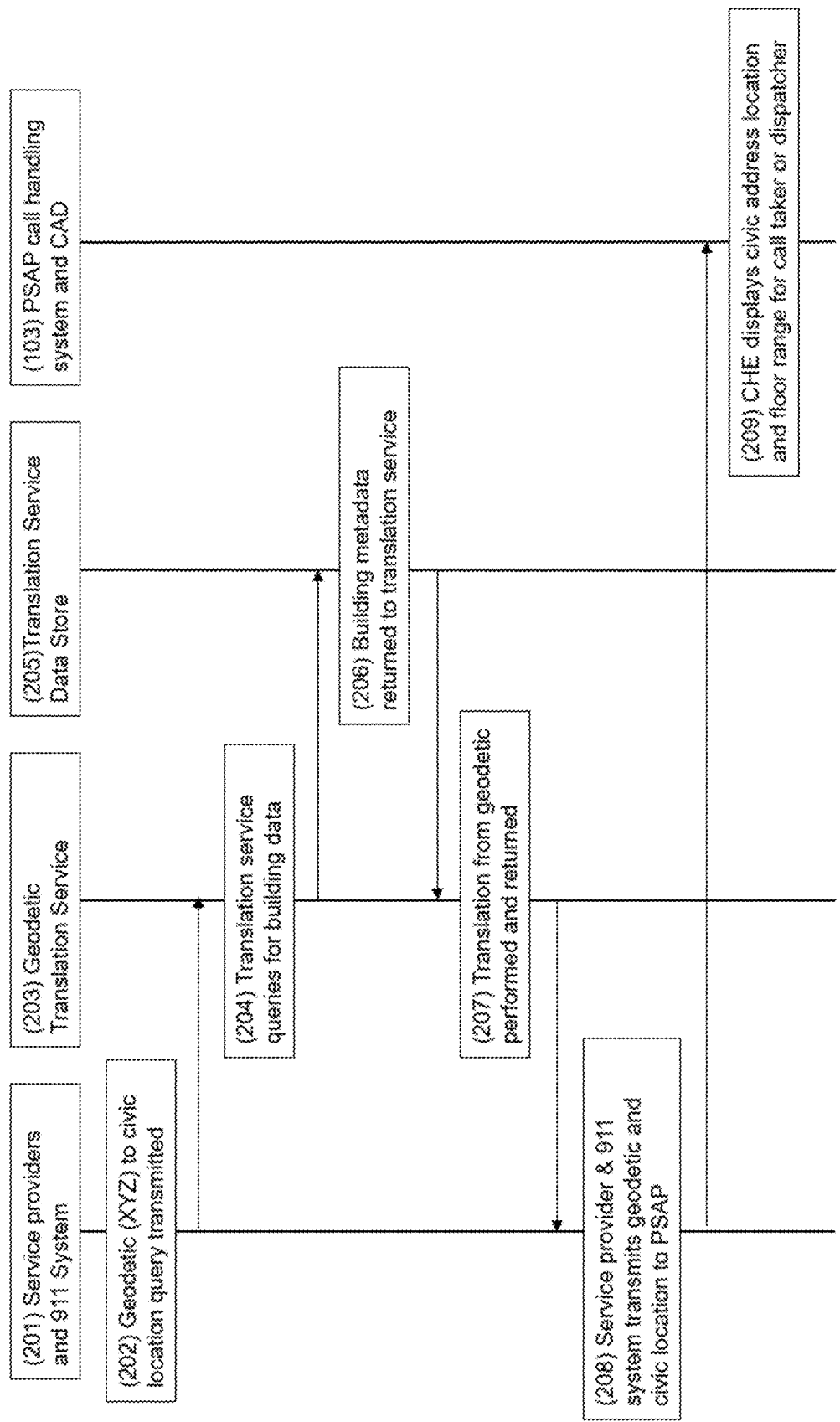
FIG. 2 depicts utilization of the invention by a communications service provider or 911 system (201) before call data is delivered to a PSAP. In this case the 911 system element queries the translation service (202), the translation service queries the data store (205), the data store returns building metadata needed to make the translation (206), and the translation service (203) then returns the calculated civic address to the 911 system element (207), which then transmits the geodetic and civic locations to the PSAP (209) with the 911 call.

In another exemplary implementation, a communications service provider such as a wireless carrier may query the inventive geodetic translation service before forwarding 9-1-1 caller location information to the 9-1-1 system and call handling equipment, as shown in FIG. 2. In this case the 9-1-1 caller location data received at the 9-1-1 call handling equipment may include both the original geodetic location, and the civic address location with sub-address floor range calculated by the inventive geodetic translation service.

The 9-1-1 call answering system may then display both the geodetic and civic locations to the 9-1-1 call taker or dispatcher without requiring the 9-1-1 call answering system to perform a query to the inventive geodetic translation service.

Figure 3:
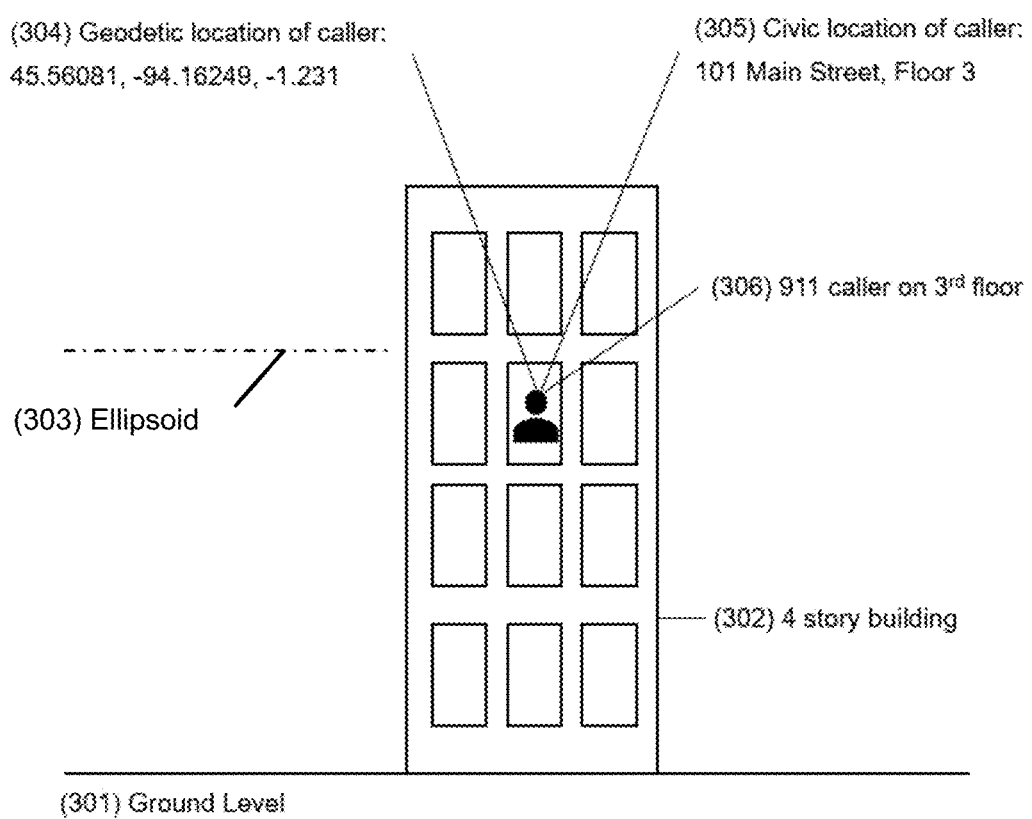
FIG. 3 depicts a 911 caller (306) on the third floor of a four-story building (302). All the floors are above ground level (301), and the 911 system identifies the geodetic position of the caller (304). The ellipsoid (303) is above the caller position in this case, and so the elevation of the user in Height Above Ellipsoid is −1.231. While this negative elevation value may be confusing to human users, the civic location "101 Main Street, Floor 3" (305) computed by the inventive geodetic translation service is actionable to human users.

Raw geodetic measurements including Height Above Ellipsoid can be confusing to human users. The ellipsoid is a smooth mathematical model of the earth and does not precisely model specific terrain height for any specific location. As a result, as shown in FIG. 3, the Height Above Ellipsoid for a 9-1-1 caller on the third floor of a building could even be a negative number even though the caller is above ground.

This negative elevation value would be confusing for a 9-1-1 call taker, dispatcher or emergency responder to interpret and make use of However, by querying the inventive geodetic translation service, a civic address with sub-address floor range may be computed that is readily actionable for 9-1-1 call takers and emergency responders.

Whereas obtaining all vertical location metadata for all buildings in the United States may not be feasible as a practical matter, the current invention can also make floor level estimations using only a building footprint, national elevation model and a floor height average assumption such as 12 feet per floor.

Incrementally adding each of the additional vertical location metadata attributes to a location record correspondingly incrementally increases the accuracy and precision of calculated floor level range. Accordingly, the Building Floor Location API includes a precision parameter in request responses indicating relative accuracy and precision of the floor estimate returned.

As there are over 125 million buildings in the United States, it is not feasible for a single entity to capture attributes including vertical location building data for all buildings in the United States using current technology. Therefore, the invention includes an authoritative crowdsourcing mechanism allowing 9-1-1 authorities, and building owners, operators and security teams to crowdsource vertical location metadata about buildings into the system utilizing a blockchain-based crowdsourcing mechanism.

Figure 4:
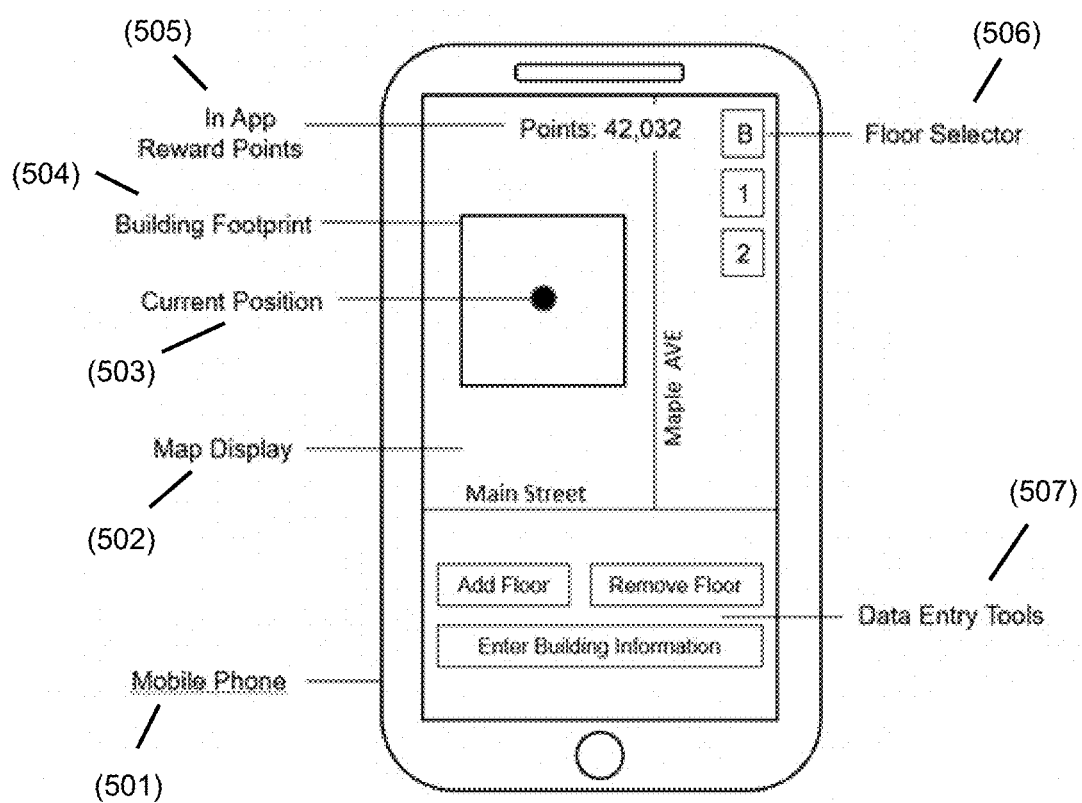
FIG. 4 depicts a mobile crowdsourcing app running on a mobile phone (401). The mobile app includes a map display (402) that depicts streets and building footprints (404) as well as the users current position based on location services available to the mobile phone (403). The app includes tools for adding and removing floors and building information (407), as well as a floor selector (406). The application displays users in app reward points (405) that correspond to tokens on a blockchain.

The blockchain based crowdsourcing mechanism provide application for collecting building information in the field, and an incentivization mechanism for participating in the network. A mobile app as shown in FIG. 4 can be utilized to gather and submit building information.

A user may travel to a building location and use tools in the app to record location as presented by the mobile phone operating system location services for each floor, as well as entering textual metadata for the building and floors into the app. The application awards the user points for each data submission, wherein each point can be redeemed for tokens on a blockchain.

FIG. 5 depicts a smart contact for a new HRC-20 Althash token called "GIS" that is to be the utility reward token for crowdsourcing incentivization. It should be obvious to those skilled in the art that different blockchains and tokens could be utilized for this in place of HCR-20 tokens on the Althash blockchain.

Figure 6:
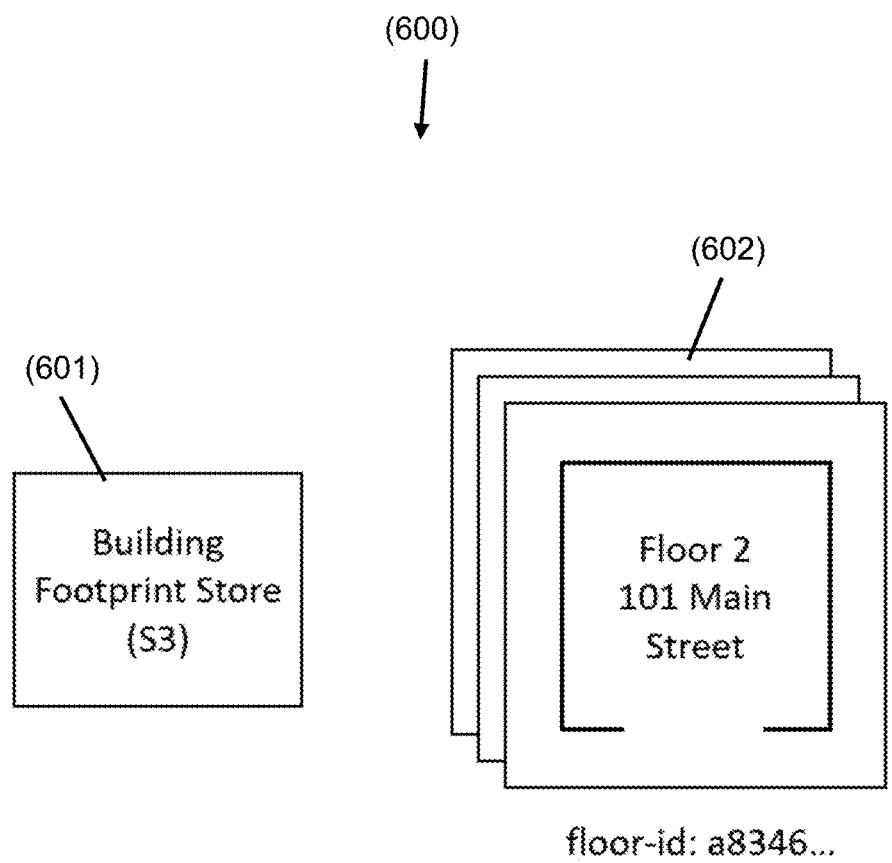
FIG. 6 depicts storage (600) of crowdsourced building data (601) such as in an Amazon Web Services ("AWS") S3 bucket (602).

As shown in FIG. 6 the building footprint data store (801) may include individual build records stored in a file-based cloud data storage container (802) such as AWS S3. The crowdsourcing application of the invention is further designed as a cloud native implementation in AWS, comprising a user application, an Amazon API gateway, an AWS Lambda, Amazon Cloud Director, and AWS Cognito.

While the current implementation is designed for Amazon AWS, it should be obvious to those skilled in the art that the system may be implemented utilizing other public or private cloud or server-based infrastructures. Importantly, the crowdsourcing mechanism includes a user scoring and ranking mechanisms that can average data submissions from multiple users for the same building location, as well as assign a higher weight to data submissions from more trusted users as shown in FIG. 8.

Figure 7:
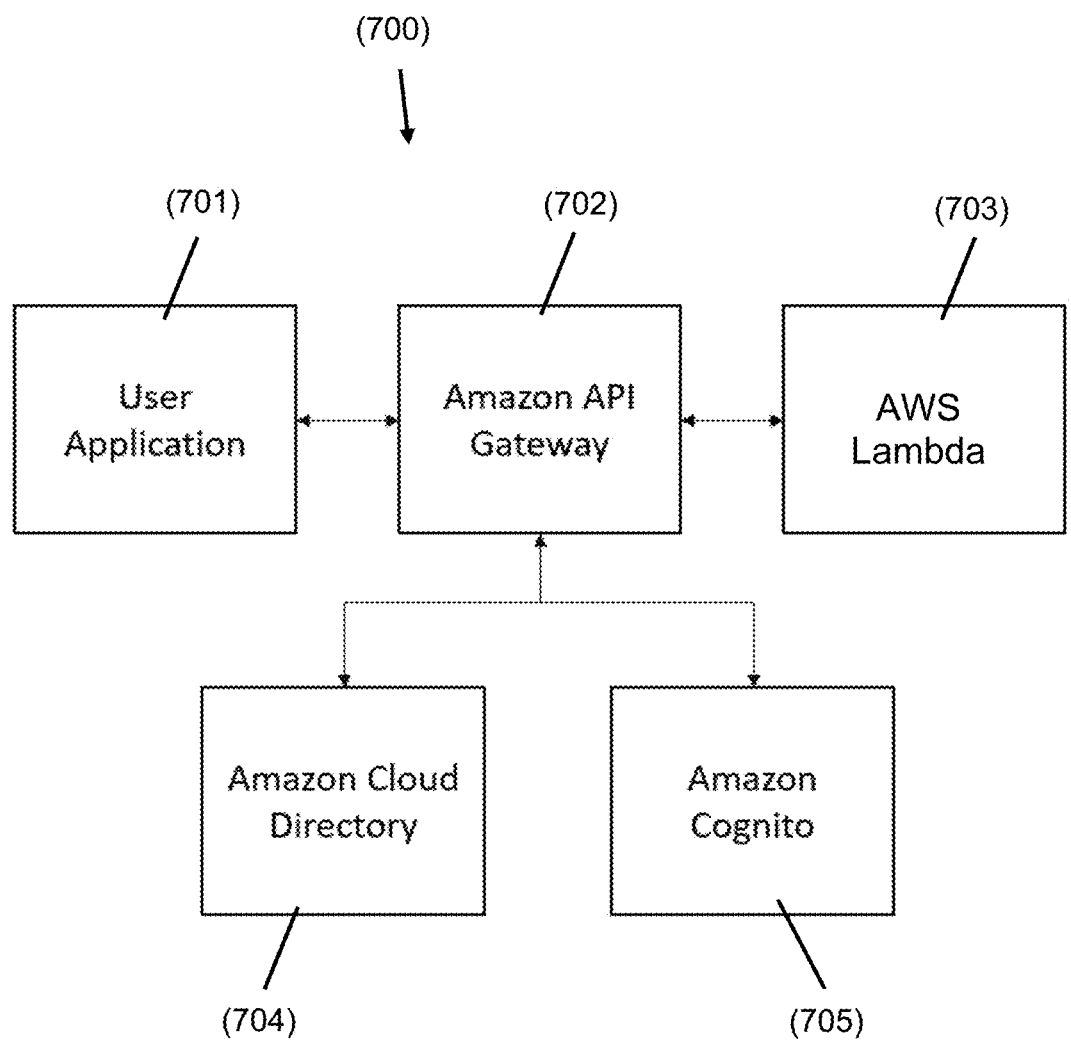
FIG. 7 depicts the cloud-native core system (700) of the crowdsourcing application that comprises a user application (701), an AWS API gateway (702), an AWS Lambda (703), Amazon Cloud Directory (704) and Amazon Cognito (705).
Figure 8:
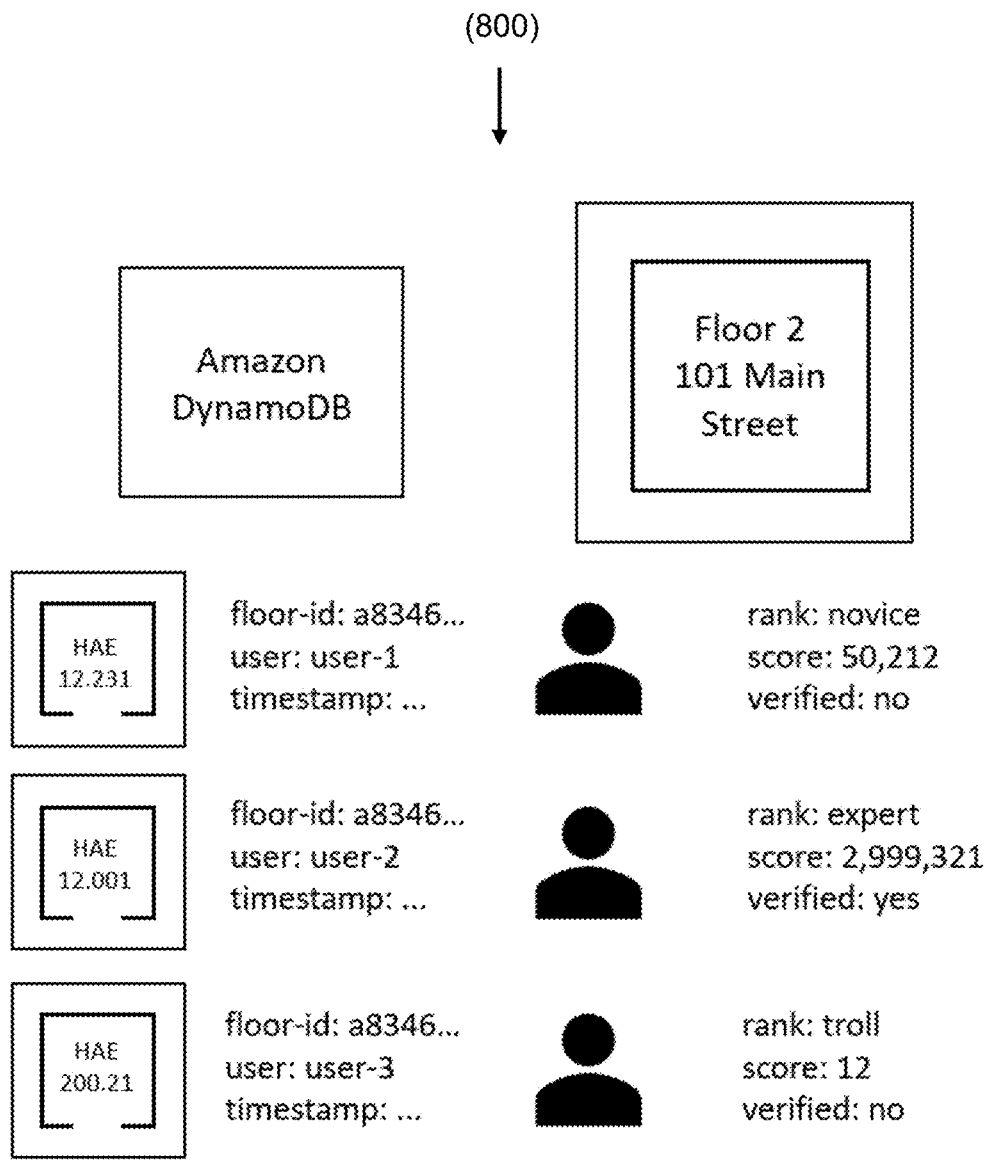
FIG. 8 depicts a scoring system (800) used to rank crowdsource user data submissions and to detect bad actors or "trolls" intentionally submitting bad information into the system.
Figure 9:
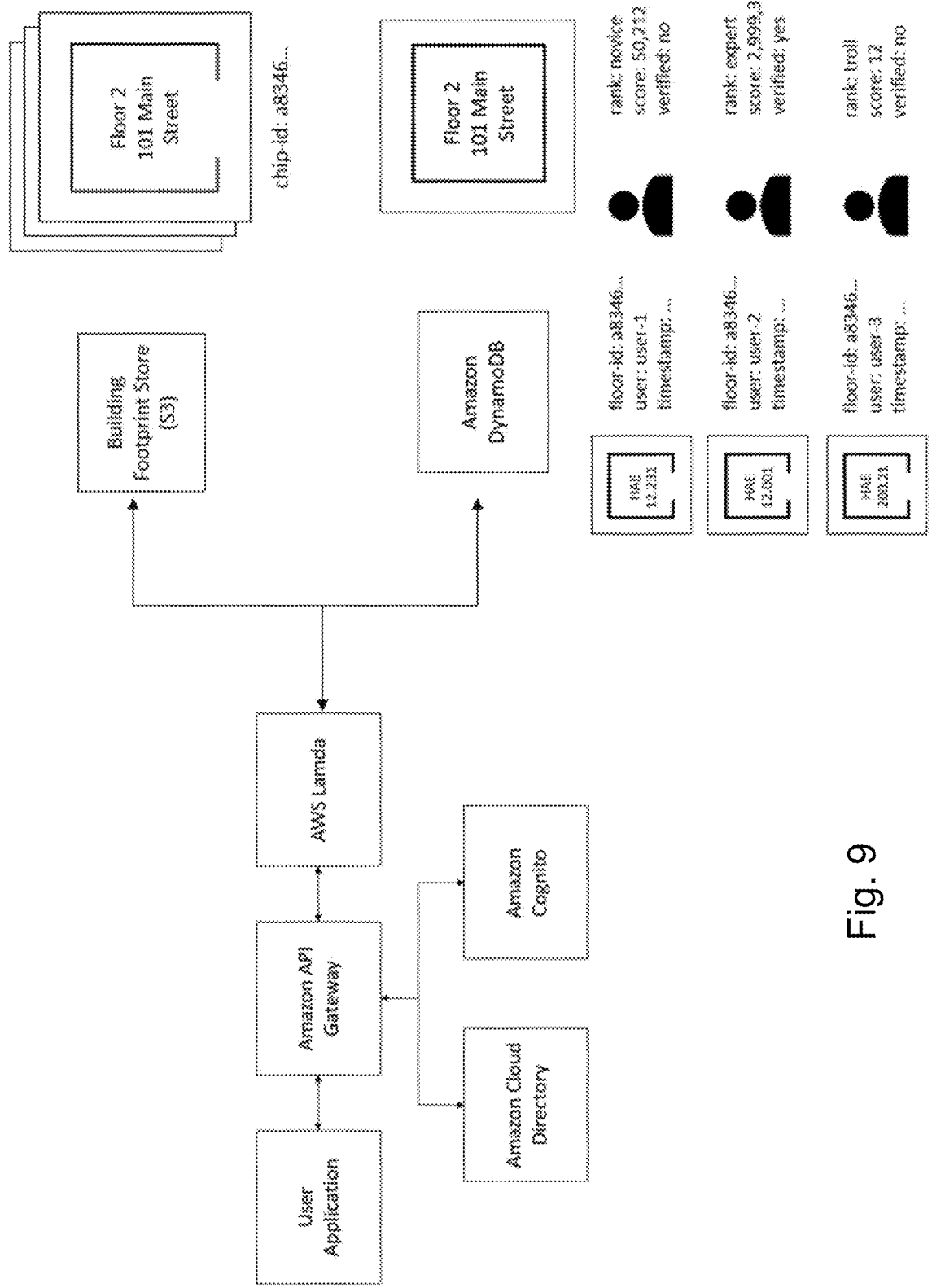
FIG. 9 depicts the relationships between the three major components of the crowdsourcing system that are depicted in FIGS. 6-8.
Figure 10:
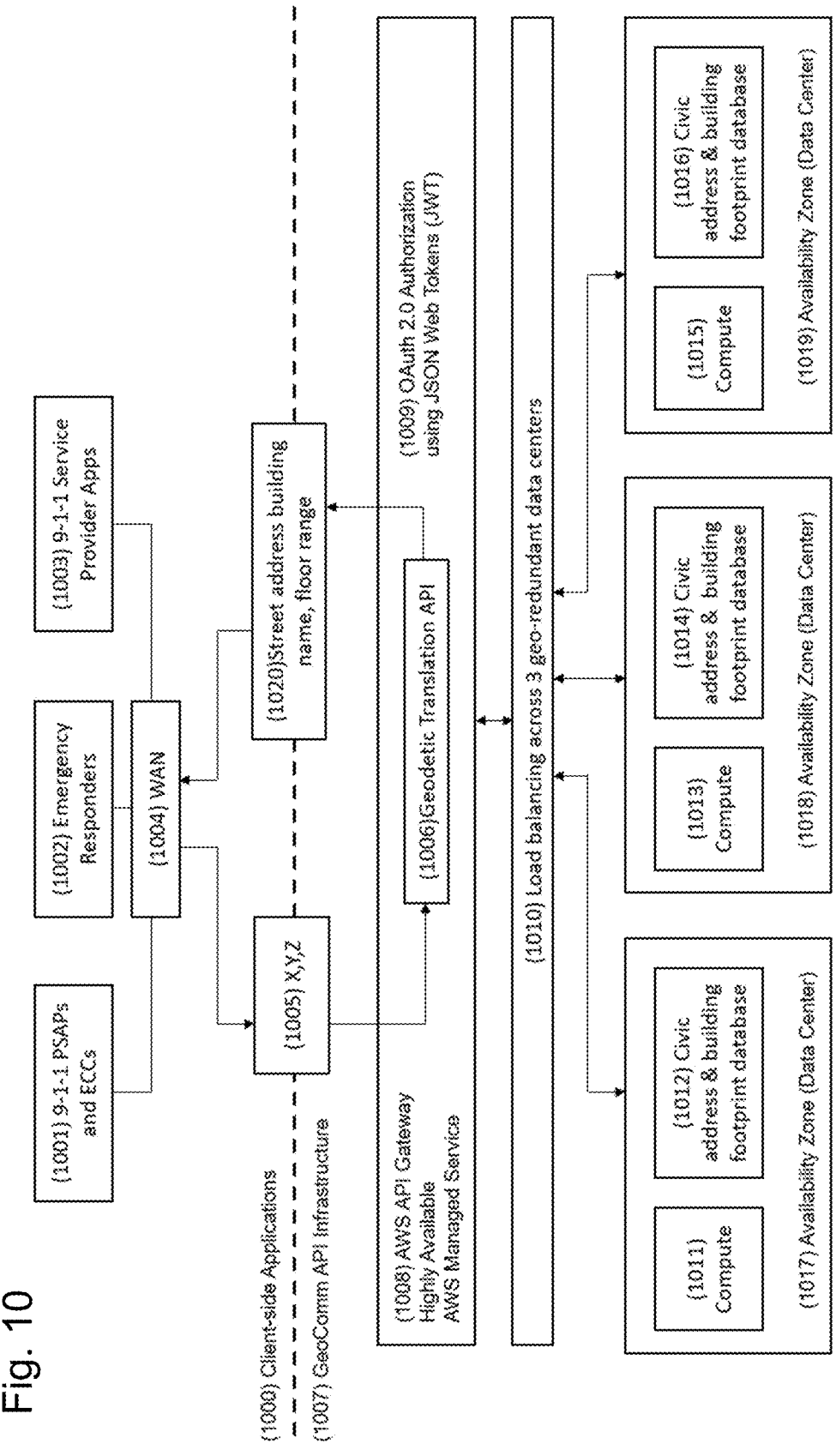
FIG. 10 depicts an exemplary embodiment of the GeoComm geodetic translation API.

FIG. 9 illustrates the relationship between the three major components of the crowdsourcing system storage of crowdsource building data (600), cloud-native core system (700) and scoring system (800) that are set forth in FIGS. 6-8.

Client slide applications (1000) running in 9-1-1 PSAPs and ECCs such as 9-1-1 call handling and CAD applications (1001), emergency responder applications such as in-vehicle mapping and navigation applications (1002) or 9-1-1 service provider applications such as location information systems, location databases systems, ALI database systems, supplemental location systems, and additional data repository systems (1003) may transmit requests across a network such as a WAN (1004) which may be a network such as the Internet and/or a VPN.

The queries contain location information such as X, Y, Z geodetic coordinates (1005). Queries are routed to the Geodetic Translation web API (1006) running in the AWS cloud native GeoComm API infrastructure (1007). Specifically, the geodetic translation API (1006) is implemented using an AWS API gateway which is a highly available AWS managed service.

The API is only accessible to authorized users. In certain embodiments, the authorization mechanism is OAuth 2.0 using JSON Web Tokens ("JWT"). The geodetic translation API utilizes cloud compute capacity (1011, 1013, 1015) and cloud data storage (1012, 1014, 1016) that is distributed across multiple AWS availability zones (1017, 1018, 1019), wherein API calls for compute and data are load balanced across 3 geo-redundant AWS data centers (1010).

Once the geodetic translation API (1006) has obtained a civic address translation (1020) for a proffered input location (1005), the civic address translation (1020) is transmitted back to the querying application (1001, 1002, or 1003) across the WAN (1004).

It should be obvious to those skilled in the art that while the described embodiment of the inventive geodetic translation API has been implemented as an AWS cloud native service, it is possible to implement the invention utilizing other public or private cloud infrastructures such as Microsoft Azure or other infrastructures.

While the described embodiment of the inventive translation API accepts as input an X, Y, Z geodetic coordinate expected to contain latitude, longitude, and height above ellipsoid, the invention includes the ability to accept other non-civic location inputs such as coordinates based in other coordinate systems and projections including but not limited to State Plane, Universal Transverse Mercator and Web Mercator projections and coordinate systems.

Similarly, while the described embodiment of the inventive translation service depicts a z-axis (vertical) measure of Height Above Ellipsoid in proffered translation requests, the inventive translation API supports other vertical measures including but not limited to height above mean sea level, and height above terrain. In addition to coordinate-based locations, the inventive translation API also supports other alphanumeric non-civic address location representations including Placekeys, What3Words, Google plus codes, United States National Grid coordinates and other alphanumeric geographic hashes proffered in translation requests.

It should be noted that the inventive translation API can return civic locations even when an incomplete input location is proffered in a request. For example, if a location containing a latitude/longitude coordinate but no elevation value is proffered in a request, they API may still respond with a civic location comprising a street address and building name, but no sub-address floor range.

Variations And Extensions Of The Invention:

While the building footprint includes a 2-dimensional polygon geometry denoting the external horizontal extent on the surface of the ground that a building covers, buildings footprints that are attributed may extruded into 3 dimensions, thus creating a 3D volumetric building database that may also have utility in emergency dispatch and response settings.

While the invention was designed to solve specific challenges to 9-1-1 and emergency responders, it should be obvious to those skilled in the art that the invention has general applicability across many industries including but not limited to communications, utilities, insurance, building information management and planning, and location-based marketing.

While a mobile phone app is demonstrated for crowdsourcing it is also possible to utilized web browser-based applications, and desktop Geographic Information Systems ("GIS") applications for crowdsourcing building information, and it is possible to track earned points for data submission outside of the submitting application itself, such as in a third party DBMS, CRM, or ERP system.

In another embodiment of the invention, a further blockchain tokenization of the system is implemented wherein rather than storing building metadata in a centralized database, the building metadata is stored in a decentralized database such as IPFS, and a hash equating to a building identifier is stored in a blockchain. In this manner and when combined with additional smart contracts and distributed applications the geodetic translation service may become self-running and decentralized as a fully distributed autonomous organization.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A method for translating geodetic position measurements of emergency caller locations into dispatchable address locations comprising:
   transmitting a geodetic location of a mobile communication device that is being used by a caller in a building to a public safety answering point;
   providing a building data store that stores a civic address for the building, latitude and longitude coordinates defining a 2-dimensional footprint of the building and vertical information about the building;
   populating the building data store utilizing crowdsourced input received from a plurality of mobile devices that are each running an application, wherein each of the applications receives input from one of a plurality of persons and wherein the crowdsourced input relates to at least one of a number of floors in the building and a height of the floors in the building;
   averaging the crowdsourced input from the plurality of persons;
   comparing the crowdsourced input from one of the plurality of persons to the averaged crowdsourced input;
   determining a compensation to be provided to the one of the plurality of persons based upon the comparison of the crowdsourced input from the one of the plurality of persons to the averaged crowdsourced input;
   transmitting compensation in blockchain tokens to the mobile device running the application to compensate the one of the plurality of persons for providing the crowdsourced input;
   converting the geodetic location to the civic address; and
   transmitting, from the building data store, the civic address of the mobile communication device to the public safety answering point.

2. The method of claim 1, wherein the geodetic location comprises a latitude, a longitude and a height and wherein the civic address comprises a street number, a street name, a city and a state.

3. The method of claim 2, wherein the height is with respect to a height above ellipsoid.

4. The method of claim 1, and further comprising:
   reviewing the crowdsourced input for accuracy; and
   ranking the crowdsource input based upon the accuracy of the crowdsourced input.

5. The method of claim 4, and further comprising ranking the one of the plurality of persons based upon the comparison of the crowdsourced input from the one of the plurality of persons to the averaged crowdsourced input.

6. A method for translating geodetic position measurements of emergency caller locations into dispatchable address locations comprising:
   transmitting a geodetic location of a mobile communication device that is being used by a caller in a building to a public safety answering point, wherein the building comprises a plurality of floors;
   providing a building data store that stores a civic address for the building, latitude and longitude coordinates defining a 2-dimensional footprint of the building and vertical information about the building;

populating the building data store utilizing crowdsourced input received from a mobile device running an application, wherein the application receives input from a person and wherein the crowdsourced input relates to at least one of a number of floors in the building and a height of the floors in the building;

transmitting blockchain tokens to the mobile device running the application to compensate the person for providing the crowdsourced input;

converting the geodetic location to the civic address; and transmitting, from the building data store, the civic address of the mobile communication device to the public safety answering point.

7. The method of claim 6, wherein the geodetic location comprises a latitude, a longitude and a height above ellipsoid and wherein the civic address comprises a street number, a street name, a city and a state.

8. The method of claim 6, and further comprising:
obtaining crowdsourced input for the building from a plurality of persons;
averaging the crowdsourced input from the plurality of persons;
comparing the crowdsourced input from the person to the averaged crowdsourced input; and
ranking the person based upon the comparison of the crowdsourced input from the person to the averaged crowdsourced input.

9. The method of claim 6, and further comprising:
obtaining crowdsourced input for a particular location from a plurality of persons;
averaging the crowdsourced input from the plurality of persons; and
comparing the crowdsourced input from the person to the averaged crowdsourced input, wherein the compensation is based upon the comparison of the crowdsourced input from the person to the averaged crowdsourced input.

10. A system for translating geodetic position measurements of emergency caller locations into dispatchable address locations comprising:
a public safety answering point configured to receive a geodetic location of a mobile communication device that is being used by a caller in a building, wherein the building comprises a plurality of floors;
a building data store that configured to receive crowdsourced input and store a civic address for the building, latitude and longitude coordinates defining a 2-dimensional footprint of the building and vertical information about the building;
a mobile device running an application configured to receive crowdsourced input from a person that is used to populate the building data store, wherein the crowdsourced input relates to at least one of a number of floors in the building and a height of the floors in the building; and
a web-based service configured to provide blockchain tokens to the mobile device running the application as compensation to the person for providing the crowdsourced input to incentivize the person to provide the crowdsourced input, wherein the building data store is further configured to convert the geodetic location to the civic address that is and transmit the civic address to the public safety answering point.

11. The system for translating geodetic position measurements of emergency caller locations into dispatchable address locations of claim 10, wherein the geodetic location comprises a latitude, a longitude and a height above ellipsoid and wherein the civic address comprises a street number, a street name, a city and a state.

12. The system for translating geodetic position measurements of emergency caller locations into dispatchable address locations of claim 10, wherein the building data store obtains crowdsourced input for the building from a plurality of persons, averages the crowdsourced input from the plurality of persons, compares the crowdsourced input from the person to the averaged crowdsourced input and ranks the person based upon the comparison of the crowdsourced input from the person to the averaged crowdsourced input.

13. The system for translating geodetic position measurements of emergency caller locations into dispatchable address locations of claim 10, wherein the building data store obtains crowdsourced input for a particular location from a plurality of persons, averages the crowdsourced input from the plurality of persons and compares the crowdsourced input from the person to the averaged crowdsourced input, wherein the compensation is in the form of points based upon the comparison of the crowdsourced input from the person to the averaged crowdsourced input.

* * * * *